(12) United States Patent
Luo et al.

(10) Patent No.: US 10,894,600 B2
(45) Date of Patent: Jan. 19, 2021

(54) AIRCRAFT, TILT DRIVING MECHANISM AND CONTROL METHOD THEREOF

(71) Applicant: AUTEL ROBOTICS CO., LTD., Guangdong (CN)

(72) Inventors: Dongdong Luo, Guangdong (CN); Marc Schwarzbach, Guangdong (CN); Wenbing Su, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 66 days.

(21) Appl. No.: 16/129,115

(22) Filed: Sep. 12, 2018

(65) Prior Publication Data

US 2019/0009901 A1 Jan. 10, 2019

Related U.S. Application Data

(63) Continuation of application No. PCT/CN2018/079013, filed on Mar. 14, 2018.

(30) Foreign Application Priority Data

Jul. 6, 2017 (CN) .......................... 2017 1 0547182

(51) Int. Cl.
*B64C 29/00* (2006.01)
*B64C 27/26* (2006.01)

(52) U.S. Cl.
CPC .......... *B64C 29/0033* (2013.01); *B64C 27/26* (2013.01); *B64C 2201/021* (2013.01);
(Continued)

(58) Field of Classification Search
CPC ..... B64C 29/0033; B64C 27/26; B64C 27/28; B64C 2201/088
See application file for complete search history.

(56) References Cited

U.S. PATENT DOCUMENTS 1,777,492 A * 10/1930 Hojnowski ......... B64C 29/0033
244/7 C
5,769,359 A * 6/1998 Rutan .................... B64C 3/385
244/120
(Continued)

FOREIGN PATENT DOCUMENTS

CN 204489181 U 7/2015
CN 205022861 U 2/2016
(Continued)

OTHER PUBLICATIONS

European Searchb Report dated Mar. 21, 2019; Appl. No. EP18753039.
(Continued)

*Primary Examiner* — Richard G Davis

(57) ABSTRACT

A tilt driving mechanism comprises a housing fixedly mounted on the aircraft, a driving mechanism mounted in the housing, and a mounting seat flexibly mounted on the housing. A power unit is fixedly mounted on the mounting seat, and the driving mechanism is fixedly connected to the mounting seat, so as to drive the mounting seat to rotate with respect to the housing. The tilt driving mechanism is disposed on the aircraft, and a rotation angle of the tilt driving mechanism is controlled with high precision to change a direction of the power unit, so that the power unit switches between a lift force providing position and a thrust providing position. Meanwhile, the driving mechanism is disposed in the tilt driving mechanism, thereby significantly reducing a torque of the driving mechanism, facilitating miniaturization design of the tilt driving mechanism, and improving stability and safety of the tilt driving mechanism.

27 Claims, 11 Drawing Sheets

(52) U.S. Cl.
CPC .. *B64C 2201/042* (2013.01); *B64C 2201/088* (2013.01); *B64C 2201/104* (2013.01)

(56) References Cited

U.S. PATENT DOCUMENTS

| | | |
|---|---|---|
| 7,802,754 B2 | 9/2010 | Karem |
| 8,276,840 B2 | 10/2012 | Karem |
| 2003/0094537 A1 | 5/2003 | Austen-Brown |
| 2018/0155019 A1* | 6/2018 | Lee .................... B64C 29/0033 |
| 2019/0071174 A1* | 3/2019 | Burigo .................. B64D 27/24 |
| 2019/0322365 A1* | 10/2019 | Gaffney .................... B64C 3/10 |

FOREIGN PATENT DOCUMENTS

| | | | |
|---|---|---|---|
| CN | 205098470 U | 3/2016 | |
| CN | 106005447 A * | 10/2016 | |
| CN | 106005447 A | 10/2016 | |
| CN | 106184736 A | 12/2016 | |
| CN | 106628201 A | 5/2017 | |
| JP | 2014-141107 A | 8/2014 | |
| WO | 2017087841 A1 | 5/2017 | |
| WO | WO-2017087841 A1 * | 5/2017 | ............. B64C 11/00 |

OTHER PUBLICATIONS

International Search Report dated May 30, 2018; PCT/CN2018/079013.

* cited by examiner

US 10,894,600 B2

AIRCRAFT, TILT DRIVING MECHANISM AND CONTROL METHOD THEREOF

CROSS-REFERENCE

This application is a continuation application of International Application No. PCT/CN2018/079013, filed on 14 Mar. 2018, which claims priority to Chinese Patent Application No. 201710547182.8, filed with the Chinese Patent Office on Jul. 6, 2017 and entitled "AIRCRAFT AND TILT DRIVING MECHANISM THEREOF", which is incorporated by reference in its entirety.

BACKGROUND

Technical Field

The present disclosure relates to the technical field of unmanned aerial vehicles, and in particular, to an aircraft, a tilt driving mechanism of the aircraft, and a control method for the tilt driving mechanism.

Related Art

With the social development and technological advancement, the unmanned aerial vehicle industry grows rapidly. Unmanned aerial vehicles are mainly classified into fixed-wing unmanned aerial vehicles and rotor unmanned aerial vehicles. A fixed-wing aircraft cannot take off/land or hover vertically and needs a relatively long taxiway because the power is mainly a pulling force provided by the head of the vehicle or a thrust provided by the tail of the vehicle. A helicopter can take off/land or hover vertically but a flight distance thereof is short. Therefore, it is necessary to provide a tilt-rotor aircraft that combines advantages of a fixed-wing aircraft and a helicopter, so as to meet customer requirements.

FIG. 1 is a schematic diagram of a tilt-rotor aircraft in the prior art. An existing tilt-rotor aircraft includes a vehicle body 1' as well as wings 2' and an empennage 3' that are provided on the vehicle body 1'. A connecting rod 4' perpendicular to a length direction of the wing 2' is provided at a middle position of the wing 2'. A steering gear 5' is provided at a joint between the connecting rod 4' and the wing 2'. Both ends of the connecting rod 4' are provided with a tilt mechanism 6' connected to the steering gear 5'. A rotor system 7' capable of tilting by 90 degrees is mounted on the tilt mechanism 6'. The steering gear 5' pulls the tilt mechanism 6' to realize 90-degree tilting of the rotor system 7'.

However, the foregoing tilt-rotor aircraft uses the steering gear 5' to drive the tilt mechanism 6' to rotate; the steering gear 5' and the tilt mechanism 6' are connected by using the connecting rod 4'. Therefore, the steering gear 5' needs to bear a relatively large torque, and this requires high performance of the steering gear 5'. Meanwhile, the connecting rod structure further increases the volume of the rotor aircraft, making it difficult to design a miniaturized aircraft. Jamming easily occurs in a flight process, lowering the stability and safety of the tilt-rotor aircraft.

SUMMARY

Accordingly, a technical problem to be solved by the present disclosure is to overcome the technical defect in the prior art that a steering gear of a tilt-rotor aircraft uses a connecting rod structure to control rotation of a tilt mechanism, causing an increase in volume and a decrease in safety and stability In order to achieve the foregoing objective, the present disclosure provides a tilt driving mechanism, mounted on an aircraft to control tilting of a power unit of the aircraft. The tilt driving mechanism includes a housing, a driving mechanism, and a mounting seat. The housing is fixedly mounted on the aircraft; the driving mechanism is mounted in the housing; and the mounting seat is flexibly mounted on the housing. A power unit is fixedly mounted on the mounting seat, and the driving mechanism is fixedly connected to the mounting seat, so as to drive the mounting seat to rotate with respect to the housing. The driving mechanism is disposed in the tilt driving mechanism, thereby significantly reducing a torque of the driving mechanism, facilitating miniaturization design of the tilt driving mechanism, avoiding jamming in a flight process, and improving stability and safety of the tilt driving mechanism.

Optionally, the driving mechanism includes a power source, a first rotation mechanism and a second rotation mechanism. An output shaft of the power source is connected to the first rotation mechanism. The second rotation mechanism is fixedly connected to the mounting seat. When the output shaft of the power source drives the first rotation mechanism to rotate, the second rotation mechanism and the first rotation mechanism are in a transmission fit. Therefore, the power source provides corresponding power for the driving mechanism. Meanwhile, through sequential transmission of the power source, the first rotation mechanism and the second rotation mechanism, the mounting seat fixedly connected to the second rotation mechanism rotates correspondingly, implementing a tilt function of the tilt driving mechanism.

Optionally, the housing includes a first shell and a second shell that are detachable and cooperate with each other. A receiving cavity is formed between the first shell and the second shell. The driving mechanism is received in the receiving cavity.

Optionally, two slots are provided on side walls of the receiving cavity. A baffle plate is inserted in the slots. The baffle plate partitions the receiving cavity into a first cavity and a second cavity. The power source is disposed in the first cavity. The first rotation mechanism and the second rotation mechanism are disposed in the second cavity. Therefore, the design of the first cavity and the second cavity facilitates mounting and fixing of the power source, the first rotation mechanism and the second rotation mechanism.

Optionally, the baffle plate is provided with a through hole, the power source is fixedly mounted on the baffle plate. The output shaft of the power source passes through the through hole and extends into the second cavity. By fixedly mounting the power source on the baffle plate and flexibly inserting the baffle plate in the slots, mounting of the power source is more convenient. Meanwhile, the through hole is provided to implement communication between the first cavity and the second cavity, that is, a connection between the power source and the first rotation mechanism is ensured.

Optionally, a controller is mounted in the aircraft. The power source includes a driving motor. Two ends of a motor shaft of the driving motor are connected to a retarding mechanism and an encoder respectively. A rotation shaft of the retarding mechanism is the output shaft, and the encoder is electrically connected to the controller. The retarding mechanism is disposed to reduce a rotational speed and increase a torque of the power source, thereby facilitating miniaturization of the specifications of the power source. That is, the weight of the tilt driving mechanism is reduced while tilt stability of the tilt driving mechanism is ensured, thereby improving flight stability of the aircraft. Moreover, the encoder is disposed, so that a rotational speed signal of the driving motor can be fed back in time.

Optionally, the first rotation mechanism is a worm, and the second rotation mechanism is a worm gear. Worm bearings are provided at both ends of a worm shaft of the worm respectively. A worm gear shaft of the worm gear is the rotation shaft. Worm gear bearings are disposed at both ends of the worm gear shaft respectively. Two first bearing cavities and two second bearing cavities are provided on an inner wall of the second cavity. The worm bearings are disposed in the first bearing cavities, and the worm gear bearings are disposed in the second bearing cavities. By using a worm gearing transmission manner, the output shaft of the power source of the driving mechanism and the rotation shaft of the driving mechanism are in different directions, thereby facilitating position arrangement of various mechanisms in the housing, and also bringing advantages of a high speed ratio, low noise and small vibration.

Optionally, the driving mechanism further includes a connection mechanism. The connection mechanism is disposed between the output shaft and the worm shaft, so as to connect the output shaft and the worm shaft, thereby ensuring stability of the connection between the output shaft and the worm shaft.

Optionally, the connection mechanism is a coupling component or a metal connection block.

Optionally, the housing is fixedly provided with a fixed seat having an opening. The mounting seat covers the fixed seat. The opening is in communication with the second cavity. The worm gear protrudes out of the second cavity and extends into the fixed seat. The worm gear shaft protrudes out of the housing and is fixedly connected to the mounting seat. Therefore, the worm gear can be first mounted on the fixed seat and then placed in the housing, so that the mounting of the worm gear is more convenient.

Optionally, the mounting seat is provided with a receiving space. The fixed seat is inserted into the receiving space. The power unit is mounted on an opposite external surface of the mounting seat which are in an insertion direction of the fixed seat. The receiving space is provided to reduce a mounting space of the fixed seat and the mounting seat, and moreover, wire materials related to the power unit can be stored and sorted reasonably, facilitating the wire trimming and wire routing of the tilt driving mechanism.

Optionally, a lead angle of the worm is less than an equivalent friction angle between the worm gear and the worm mesh gear, so that the tilt driving mechanism has a self-locking function, preventing the occurrence of reverse rotation.

In order to achieve the foregoing objective, the present disclosure further provides an aircraft, including a vehicle body and two wings disposed at two sides of the vehicle body. Stub wings perpendicular to a length direction of the wings are disposed on the two wings respectively. The tilt driving mechanisms described above are disposed on both ends of each stub wing respectively. A power unit is fixedly mounted on a mounting seat of the tilt driving mechanism. By disposing the tilt driving mechanism, any of the foregoing advantages can be achieved. Moreover, by controlling a tilt angle of the tilt driving mechanism, a direction of the power unit on the mounting seat can be changed, so that the power unit can switch between providing a lift force and providing a thrust, thereby achieving objectives of reducing costs, improving utilization of the power unit, and efficient flight.

Optionally, a controller is disposed in the vehicle body. A first inertia measurement unit is disposed on the mounting seat of the tilt driving mechanism. A second inertia measurement unit is disposed on the housing. The controller is electrically connected to the first inertia measurement unit and the second inertia measurement unit. The controller obtains a position of the mounting seat of the tilt driving mechanism according to information collected by the first inertia measurement unit and the second inertia measurement unit. The first inertia measurement unit and the second inertia measurement unit are provided, so that a tilt angle of the tilt driving mechanism can be detected in real time.

Optionally, when the aircraft is in a taking off/landing or hovering state, the mounting seat of the tilt driving mechanism is in a vertical position. When the aircraft is in a flight state, the mounting seat of the tilt driving mechanism is in a horizontal position, and power units which are away from a flight direction on the stub wings stop working. Therefore, power units along the flight direction on the stub wings provide a corresponding thrust for the flight of the aircraft.

Optionally, the power unit is a propeller.

In order to achieve the foregoing objective, the present disclosure further provides a control method for a tilt driving mechanism, comprising steps of: acquiring data of a first inertia measurement unit and data of a second inertia measurement unit; processing the acquired data to obtain a tilt angle of a tilt driving mechanism; and controlling driving of a driving mechanism, so that a rotation shaft drives a mounting seat to rotate to a set position. Therefore, by measuring a tilt angle position of the tilt driving mechanism in real time, a rotation angle of the tilt driving mechanism can be controlled with high precision.

Optionally, before the step of controlling driving of a driving mechanism, so that a rotation shaft drives a mounting seat to rotate to a set position, the method further includes steps of: controlling a driving motor of the driving mechanism to rotate one revolution; and calculating a rotation angle the tilt driving mechanism rotates when the driving motor rotates one revolution according to a reduction ratio n1 of a retarding mechanism connected to the driving motor and a transmission ratio n2 between a first rotation mechanism and a second rotation mechanism in the driving mechanism, where the rotation angle of the tilt driving mechanism equals $360°/(n1*n2)$.

Optionally, after the step of processing the acquired data to obtain a tilt angle of a tilt driving mechanism, the method further includes steps of: calculating, according to the acquired tilt angle, an angle difference by which the tilt driving mechanism needs to rotate when the mounting seat rotates to the set position; calculating a rotation angle of the driving motor according to the angle difference and the rotation angle; and controlling the driving motor to rotate. Therefore, the tilt driving mechanism drives the rotation shaft to rotate, thus driving the mounting seat to rotate to the set position.

Optionally, tilt driving mechanism in the method is mounted on an aircraft to control tilting of a power unit of the aircraft, and wherein the tilt driving mechanism comprises:

a housing, fixedly mounted on the aircraft;

a driving mechanism, mounted in the housing; and the mounting seat, flexibly mounted on the housing, the power unit being fixedly mounted on the mounting seat, and the driving mechanism being fixedly connected to the mounting seat, so as to drive the mounting seat to rotate with respect to the housing.

Optionally, the driving mechanism comprises a power source, a first rotation mechanism, and a second rotation mechanism, wherein an output shaft of the power source is connected to the first rotation mechanism, a rotation shaft on the second rotation mechanism is fixedly connected to the mounting seat, and when the output shaft of the power source drives the first rotation mechanism to rotate, the second rotation mechanism and the first rotation mechanism are in a transmission fit.

Optionally, the housing comprises a first shell and a second shell that are detachable and cooperate with each other, a receiving cavity is formed between the first shell and the second shell, and the driving mechanism is received in the receiving cavity.

Optionally, two slots are provided on side walls of the receiving cavity and a baffle plate is inserted in the slots, wherein the baffle plate partitions the receiving cavity into a first cavity and a second cavity, wherein the power source is disposed in the first cavity, and the first rotation mechanism and the second rotation mechanism are disposed in the second cavity.

Optionally, the baffle plate is provided with a through hole, the power source is fixedly mounted on the baffle plate, and the output shaft of the power source passes through the through hole and extends into the second cavity.

Optionally, a controller is mounted in the aircraft; the power source comprises a driving motor, wherein two ends of a motor shaft of the driving motor are connected to a retarding mechanism and an encoder respectively, and wherein a rotation shaft of the retarding mechanism is the output shaft, and the encoder is electrically connected to the controller.

Optionally, the first rotation mechanism is a worm, and the second rotation mechanism is a worm gear; wherein worm bearings are disposed at both ends of a worm shaft of the worm respectively, a worm gear shaft of the worm gear is the rotation shaft, and worm gear bearings are disposed at both ends of the worm gear shaft respectively; and wherein two first bearing cavities and two second bearing cavities are provided on an inner wall of the second cavity, the worm bearings are disposed in the first bearing cavities, and the worm gear bearings are disposed in the second bearing cavities.

Optionally, the driving mechanism further comprises a connection mechanism, the connection mechanism is disposed between the output shaft and the worm shaft, so as to connect the output shaft and the worm shaft.

Optionally, the connection mechanism is a coupling component or a metal connection block.

Optionally, the housing is fixedly provided with a fixed seat having an opening, wherein the mounting seat covers the fixed seat, and the opening is in communication with the second cavity, and wherein the worm gear protrudes out of the second cavity and extends into the fixed seat, and the worm gear shaft protrudes out of the housing and is fixedly connected to the mounting seat.

Optionally, the mounting seat is provided with a receiving space, wherein the fixed seat is inserted into the receiving space, and the power unit is mounted on an opposite external surface of the mounting seat which are in an insertion direction of the fixed seat.

Optionally, a lead angle of the worm is less than an equivalent friction angle between the worm gear and the worm mesh gear.

According to the tilt driving mechanism, the control method for the tilt driving mechanism and the aircraft provided by the present disclosure, the tilt driving mechanism is disposed on the aircraft. Therefore, a rotation angle of the tilt driving mechanism can be controlled with high precision by measuring a tilt angle position of the tilt driving mechanism in real time, so as to change a direction of the power unit mounted on the tilt driving mechanism. As such, the power unit can switch between a lift force providing position and a thrust providing position. Moreover, the driving mechanism is disposed in the tilt driving mechanism, thereby significantly reducing a torque of the driving mechanism, facilitating miniaturization design of the tilt driving mechanism, avoiding jamming during a flight process of the aircraft, and improving stability and safety of the tilt driving mechanism. Therefore, the aircraft achieves objectives of reducing costs, improving utilization of the power unit, and efficient flight.

BRIEF DESCRIPTION OF THE DRAWINGS

In order to describe technical solutions of specific implementations of the present disclosure more clearly, the present disclosure is described in further detail below with reference to specific embodiments of the present disclosure in combination with accompanying drawings.

DESCRIPTION OF REFERENCE NUMERALS IN THE DRAWINGS

1'—vehicle body; 2'—wing; 3'—empennage; 4'—connecting rod; 5'—steering gear;
6'—tilt mechanism; 7'—rotor system; 100—tilt driving mechanism; 1—housing;
11—first shell; 12—second shell; 13—receiving cavity; 131—slot; 132—first cavity;
133—second cavity; 1331—first bearing cavity; 1332—second bearing cavity; 14—baffle plate;
141—through hole; 15—fixed seat; 21—power source; 211—output shaft; 212—driving motor;

213—retarding mechanism; 214—encoder; 22—first rotation mechanism; 221—worm shaft;
222—worm bearing; 23—second rotation mechanism; 231—rotation shaft; 232—worm gear bearing;
24—connection mechanism; 3—mounting seat; 31—receiving space; 4—first inertia measurement unit;
5—second inertia measurement unit; 200—aircraft; 201—vehicle body; 202—wing;
203—stub wing; 300—power unit.

DETAILED DESCRIPTION

The technical solutions of the present disclosure will be described clearly and completely in the following with reference to the accompanying drawings. Apparently, the described embodiments are only some embodiments rather than all embodiments of the present disclosure. Based on the embodiments in the present disclosure, all other embodiments obtained by a person of ordinary skill in the art without making creative efforts belong to the protection scope of the present disclosure.

It should be noted that in the description of the present disclosure, the term "fixedly connected" may indicate that two components are directly connected or indirectly connected; terms "first" and "second" are merely used for the descriptive purpose, and cannot be interpreted as indicating or implying relative importance.

In addition, the technical features in different implementations of the present disclosure described below can be randomly combined with each other provided that there is no conflict.

Embodiment 1

Figure 1:
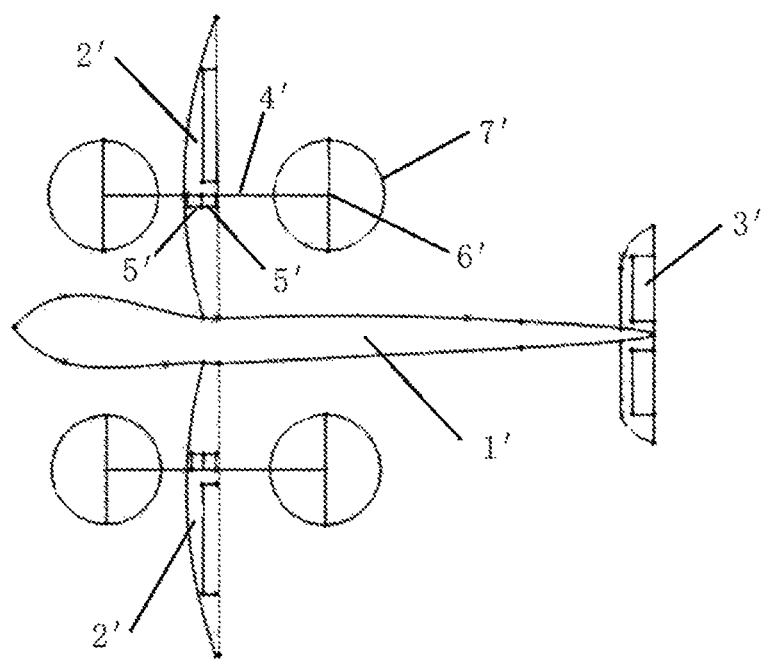
FIG. 1 is a schematic diagram of a tilt-rotor aircraft in the prior art.
Figure 2:
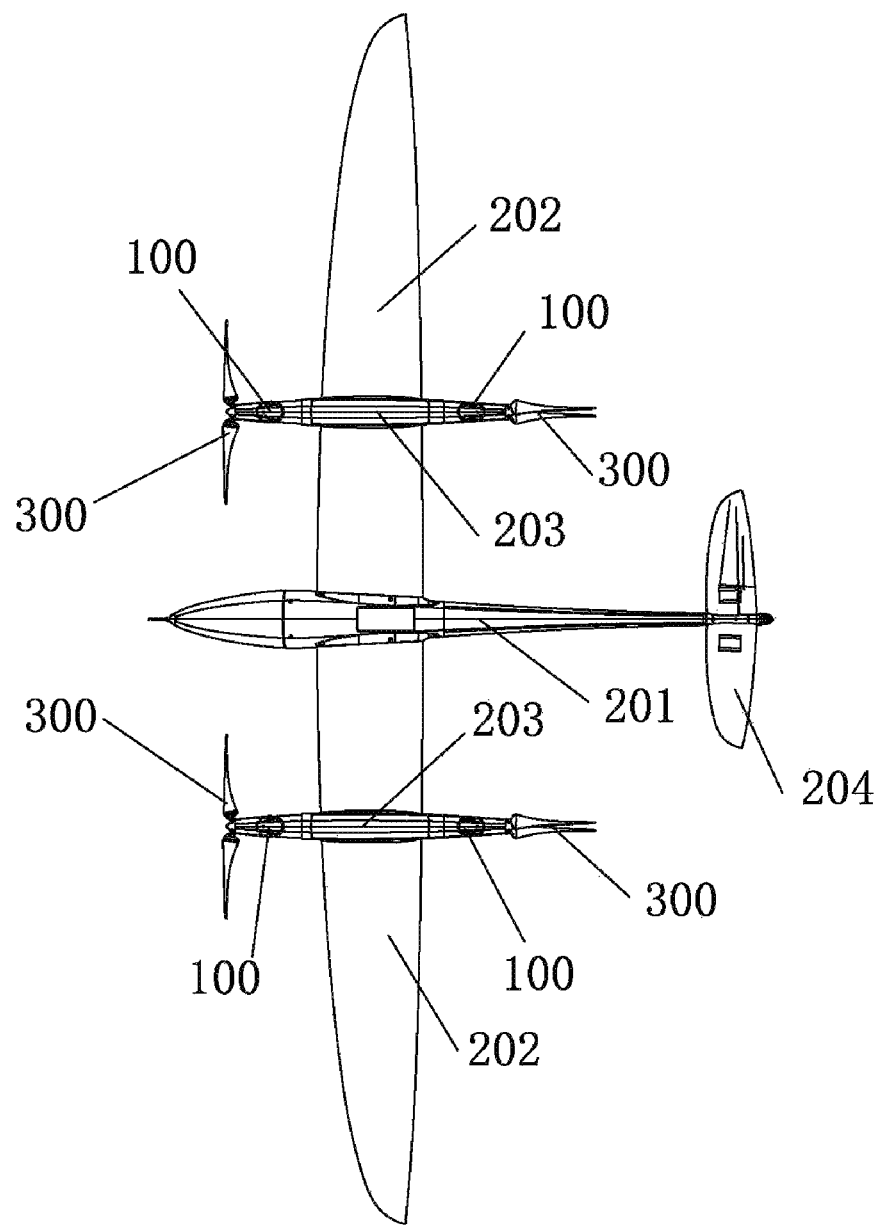
FIG. 2 is a top view of an aircraft according to the present disclosure.
Figure 3:
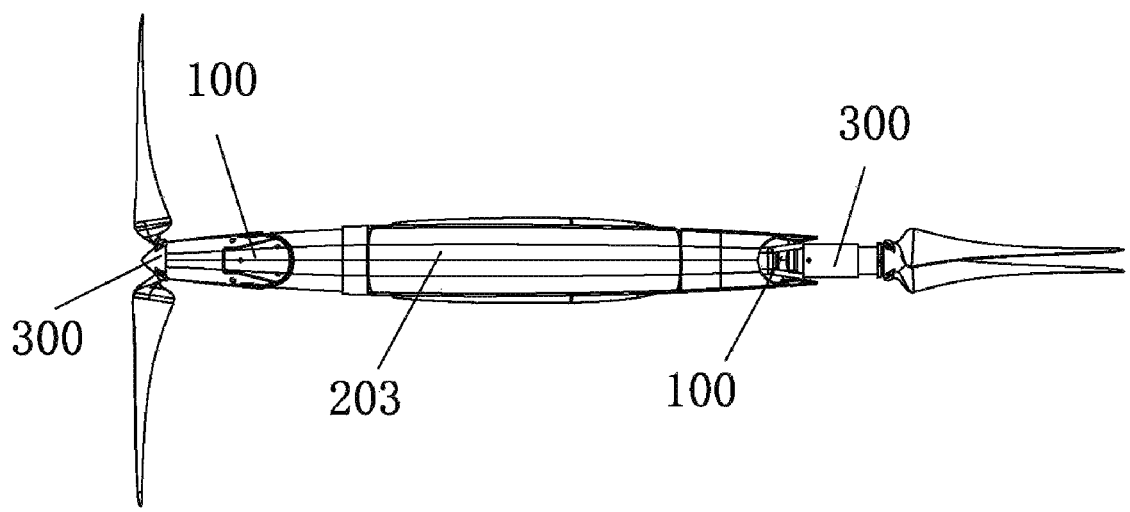
FIG. 3 is a partial enlarged view of the aircraft shown in FIG. 2, which shows a state in which power units of the aircraft are mounted on a stub wing.
Figure 4:
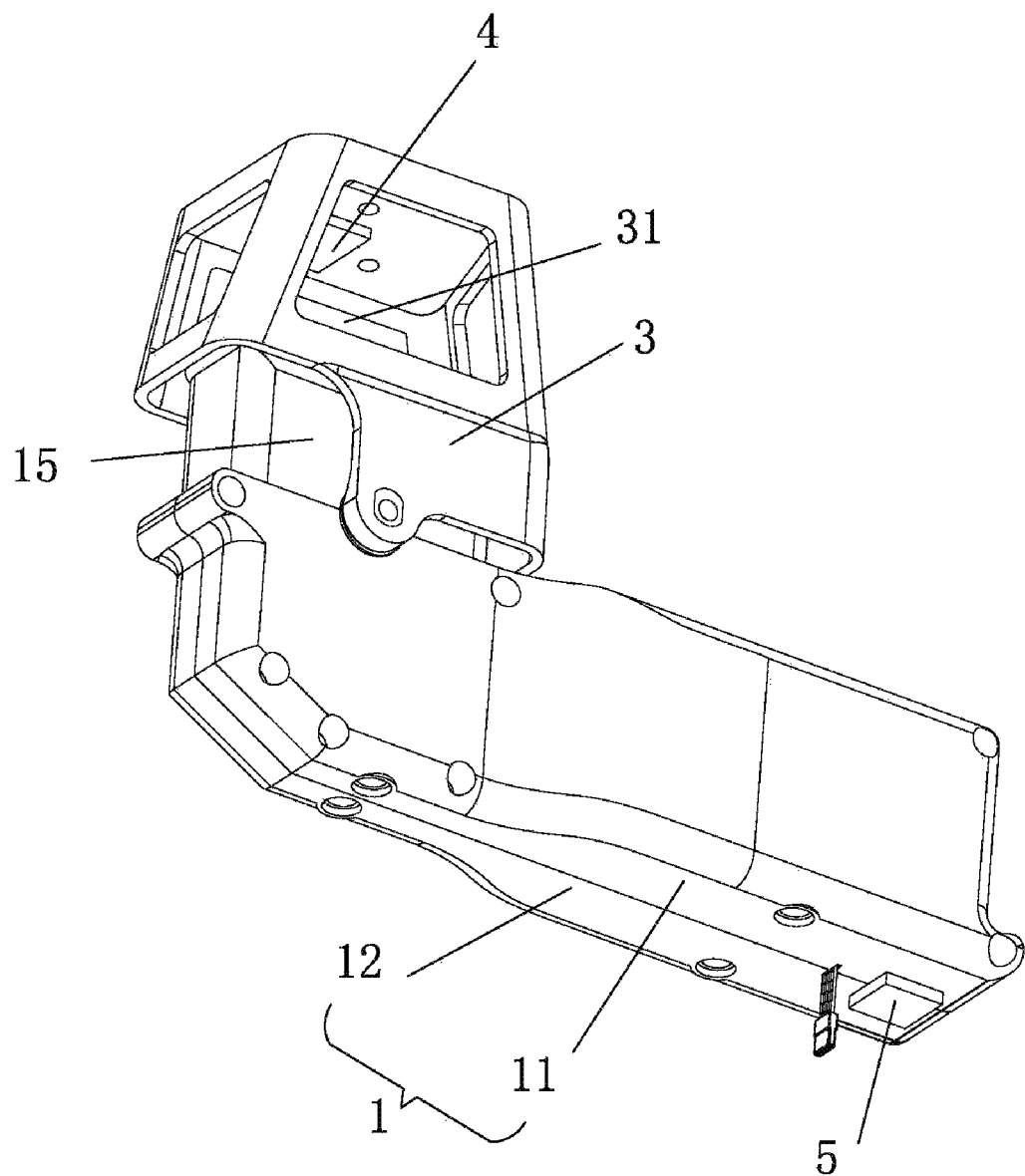
FIG. 4 is a perspective view of the tilt driving mechanism of the aircraft shown in FIG. 2 when the a mounting seat thereof is at a vertical position.
Figure 5:
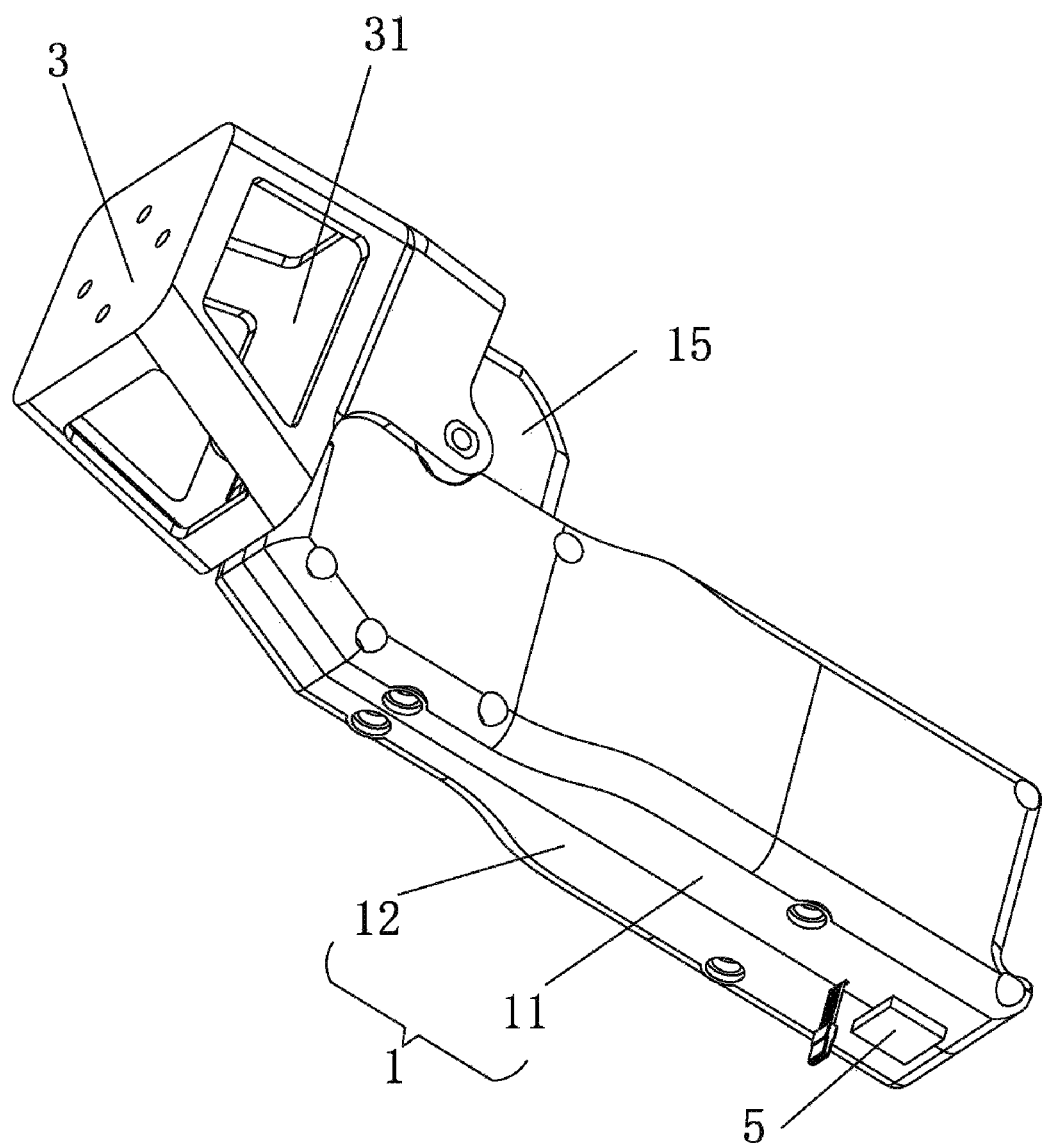
FIG. 5 is a perspective view of the tilt driving mechanism of the aircraft shown in FIG. 2 when the mounting seat thereof is at a horizontal position.

An aircraft 200 shown in FIG. 2 and FIG. 3 includes a vehicle body 201 and two wings 202 disposed at two sides of the vehicle body 201. Stub wings 203 perpendicular to a length direction of the wings 202 are disposed on the two wings 202 respectively. Both ends of the stub wing 203 are respectively provided with tilt driving mechanisms 100 for controlling tilting of power units 300. With reference to FIG. 4 and FIG. 5, the tilt driving mechanism 100 includes a housing 1, a driving mechanism, and a mounting seat 3. The housing 1 is fixedly mounted on the aircraft 200. For example, the housing 1 is locked on the aircraft 200 by using screws or adhered to the aircraft 200 by using an adhesive. The driving mechanism is mounted in the housing 1. The mounting seat 3 is flexibly mounted on the housing 1. For example, the mounting seat 3 is flexibly connected to the housing in a hinged manner. A power unit 300 is fixedly mounted on the mounting seat 3, and the driving mechanism is fixedly connected to the mounting seat 3, so as to drive the mounting seat 3 to rotate with respect to the housing 1. The driving mechanism is disposed in the tilt driving mechanism 100, thereby significantly reducing a torque of the driving mechanism, facilitating miniaturization design of the tilt driving mechanism 100, avoiding jamming in a flight process, and improving stability and safety of the tilt driving mechanism 100.

In the foregoing aircraft 200, the tilt driving mechanism 100 is disposed. A rotation angle of the tilt driving mechanism 100 can be controlled with high precision by measuring a tilt angle position of the tilt driving mechanism 100 in real time, so as to change a direction of the power unit 300 mounted on the tilt driving mechanism 100. As such, the power unit 300 can switch between a lift force providing position and a thrust providing position. Moreover, the driving mechanism is disposed in the tilt driving mechanism 100, thereby significantly reducing a torque of the driving mechanism, facilitating miniaturization design of the tilt driving mechanism 100, avoiding jamming during a flight process, and improving stability and safety of the tilt driving mechanism 100. Therefore, utilization of the power unit 300 is improved and an objective of efficient flight is achieved.

Figure 6:
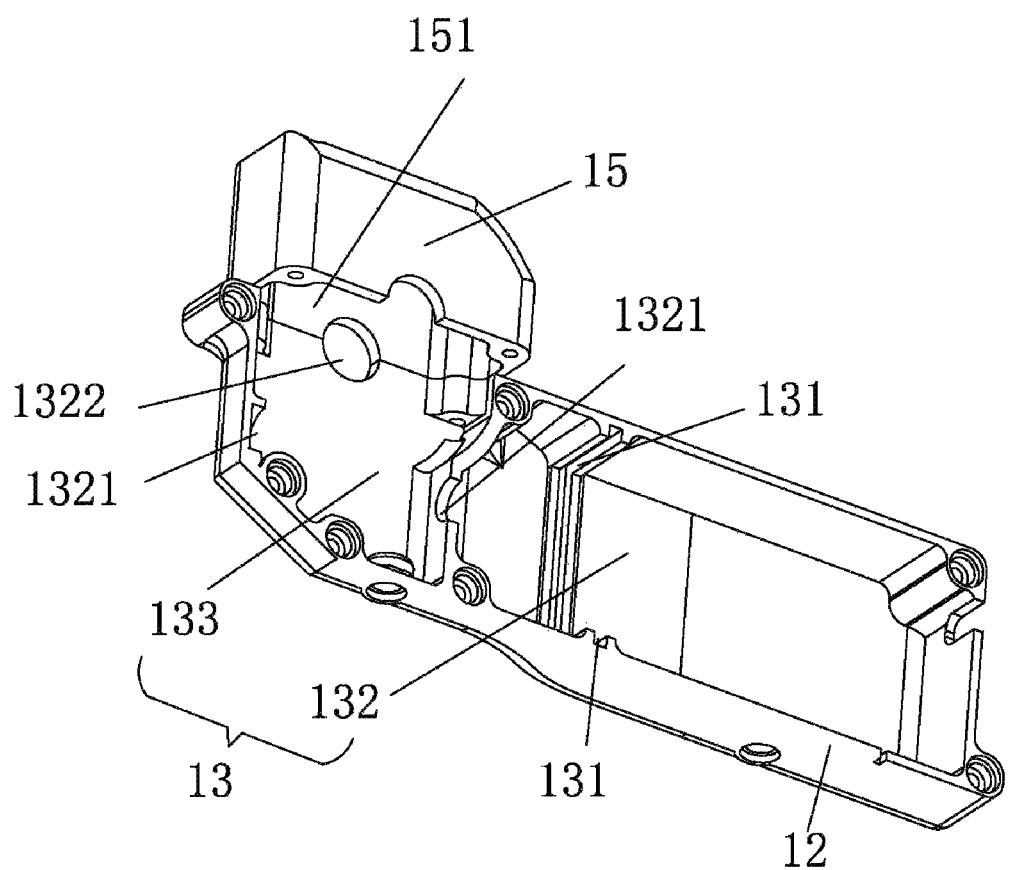
FIG. 6 is a perspective view of a second shell and a fixed seat of the tilt driving mechanism shown in FIG. 4.
Figure 7:
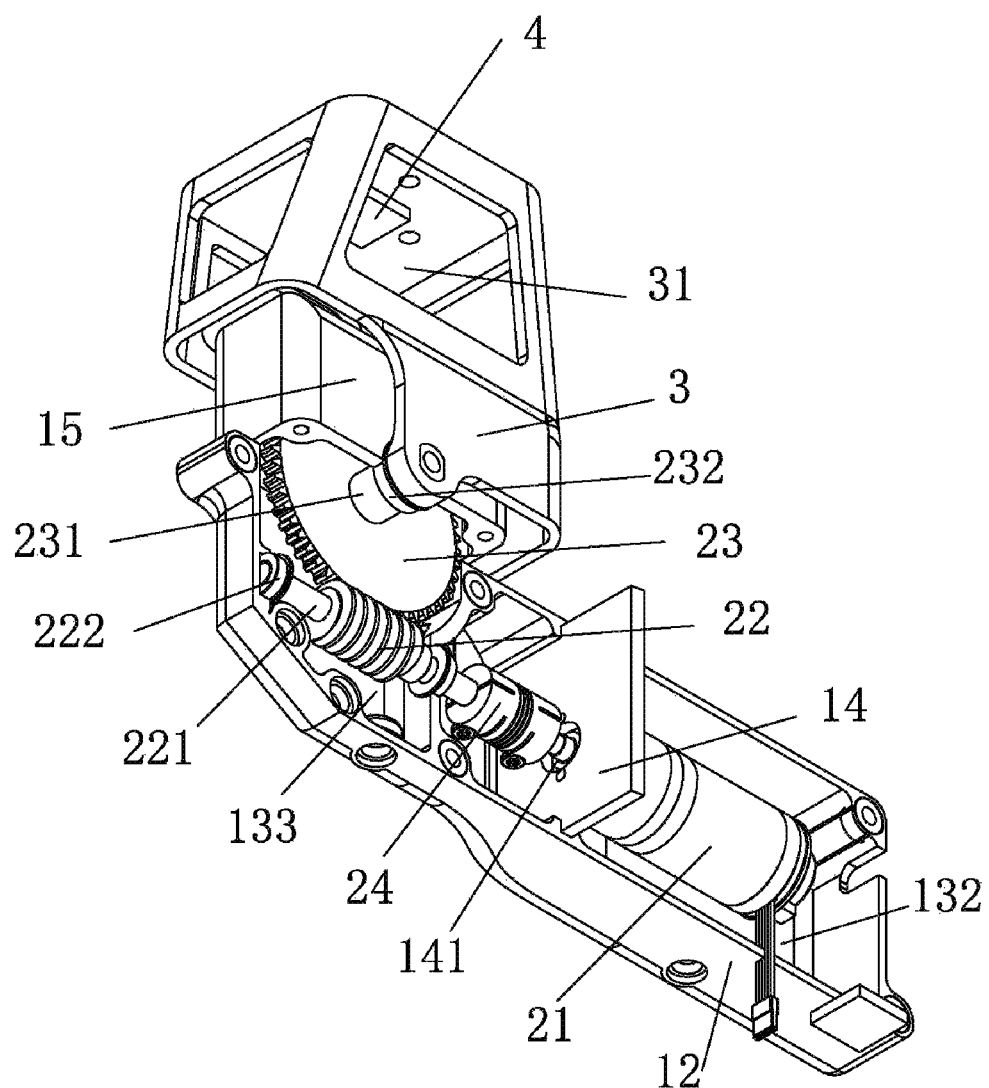
FIG. 7 is a perspective view of the tilt driving mechanism shown in FIG. 4 after a first shell thereof is removed.

With reference to FIG. 5 and FIG. 6, the housing 1 includes a first shell 11 and a second shell 12 that are detachable and cooperate with each other. A receiving cavity 13 is formed between the first shell 1 and the second shell 2, and the driving mechanism is received in the receiving cavity 13. Two slots 131 are provided on side walls of the receiving cavity 13. With reference to FIG. 7, a baffle plate 14 is inserted in the slots 131. The baffle plate 14 partitions the receiving cavity 13 into a first cavity 132 and a second cavity 133. A through hole 141 is provided on the baffle plate 14. Moreover, the housing 1 is fixedly provided with a fixed seat 15 having an opening, and the opening is in communication with the second cavity 133.

Figure 8:
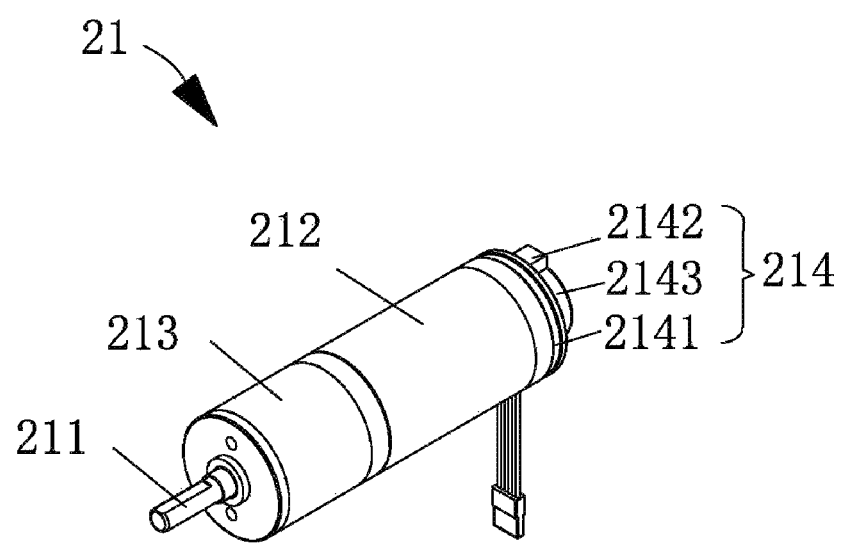
FIG. 8 is a perspective view of a power source of the tilt driving mechanism shown in FIG. 4.
Figure 9:
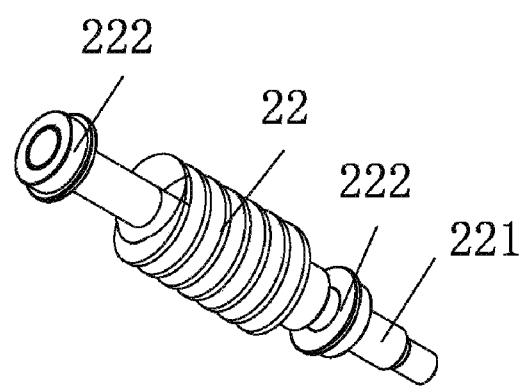
FIG. 9 is a perspective view of a first rotation mechanism of the tilt driving mechanism shown in FIG. 4.

With reference to FIG. 7 to FIG. 9, the driving mechanism includes a power source 21, a first rotation mechanism 22, a second rotation mechanism 23 and a connection mechanism 24. The power source 21 is disposed in the first cavity 132. The first rotation mechanism 22 and the second rotation mechanism 23 are disposed in the second cavity 133. An output shaft 211 of the power source 21 is connected to the first rotation mechanism 22. Besides, the second rotation mechanism 23 is fixedly connected to the mounting seat 3. When the output shaft 211 of the power source 21 drives the first rotation mechanism 22 to rotate, the second rotation mechanism 23 and the first rotation mechanism 22 are in a transmission fit. Therefore, the design of the first cavity 132 and the second cavity 133 facilitates mounting and fixing of the power source 21, the first rotation mechanism 22, and the second rotation mechanism 23. Meanwhile, through sequential transmission of the power source 21, the first rotation mechanism 22 and the second rotation mechanism 23, the mounting seat 3 fixedly connected to the second rotation mechanism 23 rotates correspondingly, implementing a tilt function of the tilt driving mechanism 100.

The power source 21 is fixedly mounted on the baffle plate 14, and the output shaft 211 of the power source 21 passes through the through hole 141 and extends into the second cavity 133, so that mounting of the power source 21 is more convenient, implementing the connection between the power source 21 and the first rotation mechanism 22. Specifically, the power source 21 includes a driving motor 212. Two ends of a motor shaft of the driving motor 212 are connected to a retarding mechanism 213 and an encoder 214 respectively. A rotation shaft of the retarding mechanism 213 is the output shaft 211, so as to reduce a rotational speed and increase a torque of the power source 21, thereby facilitating miniaturization of the specifications of the power source 21. That is, the weight of the tilt driving mechanism 100 is reduced while tilt stability of the tilt driving mechanism 100 is ensured, thereby improving flight stability of the aircraft 200.

In an embodiment, the first rotation mechanism 22 is a worm, and the second rotation mechanism 23 is a worm gear. A lead angle of the worm is less than an equivalent friction angle between the worm gear and the worm mesh gear, so that the tilt driving mechanism 100 has a self-locking function, preventing the occurrence of reverse rotation. Specifically, worm bearings 222 are disposed at both ends of the worm shaft 221 of the worm respectively. A worm gear shaft of the worm gear is the rotation shaft 231.

Worm gear bearings are disposed at both ends of the worm gear shaft respectively. Two first bearing cavities 1331 and two second bearing cavities 1332 are provided on an inner wall of the second cavity 133. The worm bearings 222 are disposed in the first bearing cavities 1331, and the worm gear bearings 232 are disposed in the second bearing cavities 1332. By using a worm gearing transmission manner, the output shaft 211 of the power source 21 of the driving mechanism and the rotation shaft 231 of the driving mechanism are in different directions, thereby facilitating position arrangement of various mechanisms in the housing 1, and also bringing advantages of a high speed ratio, low noise and small vibration.

The connection mechanism 24 is disposed between the output shaft 211 and the worm shaft 221, so as to connect the output shaft 211 and the worm shaft 221, thereby ensuring stability of the connection between the output shaft 211 and the worm shaft 221. In this embodiment, the connection mechanism 24 is a coupling component or a metal connection block.

Figure 10:
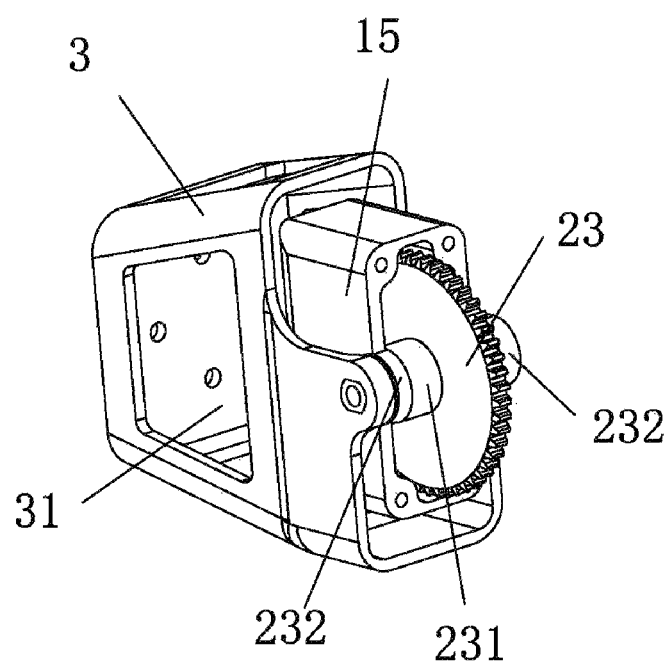
FIG. 10 is a perspective view of mounting of a second rotation mechanism, a fixed seat, and a mounting seat of the tilt driving mechanism shown in FIG. 4.

As shown in FIG. 6 and FIG. 10, the mounting seat 3 covers the fixed seat 15. A receiving space 31 is provided on the mounting seat 3. The fixed seat 15 is inserted into the receiving space 31. The worm gear protrudes out of the second cavity 133 and extends into the fixed seat 15, and the worm gear shaft protrudes out of the housing 1 and is fixedly connected to the mounting seat 3. Therefore, the worm gear can be first mounted on the fixed seat 15 and then placed in the housing 1, so that the mounting of the worm gear is more convenient. Moreover, the power unit 300 is a propeller, and is mounted on an opposite external surface of the mounting seat 3 which are in an insertion direction of the fixed seat 15. The receiving space 31 is provided to reduce a mounting space of the fixed seat 15 and the mounting seat 3, and moreover, wire materials related to the power unit 300 can be stored and sorted reasonably, facilitating the wire trimming and wire routing of the tilt driving mechanism 100.

When the aircraft 200 is in a taking off/landing or hovering state, the mounting seat 3 of the tilt driving mechanism 100 is in a vertical position, thereby providing a sufficient lift force for the aircraft 200. When the aircraft 200 is in a flight state, the mounting seat 3 of the tilt driving mechanism 100 is in a horizontal position, and power units 300 which are away from a flight direction on the stub wings 203 stop working, so that power units 300 along the flight direction on the stub wings 203 provide a corresponding thrust for the flight of the aircraft 200.

In addition, a controller is disposed in the vehicle body 201. The encoder 214 is electrically connected to the controller, so that a rotational speed signal of the driving motor 212 can be fed back in time. A first inertia measurement unit 4 is disposed on the mounting seat 3. A second inertia measurement unit 5 is disposed on the housing. The controller is electrically connected to the first inertia measurement unit 4 and the second inertia measurement unit 5. The controller obtains a position of the mounting seat 3 of the tilt driving mechanism 100 according to information collected by the first inertia measurement unit 4 and the second inertia measurement unit 5. By setting the first inertia measurement unit 4 and the second inertia measurement unit 5, a tilt angle of the tilt driving mechanism 100 can be detected in real time.

Embodiment 2

Figure 11:
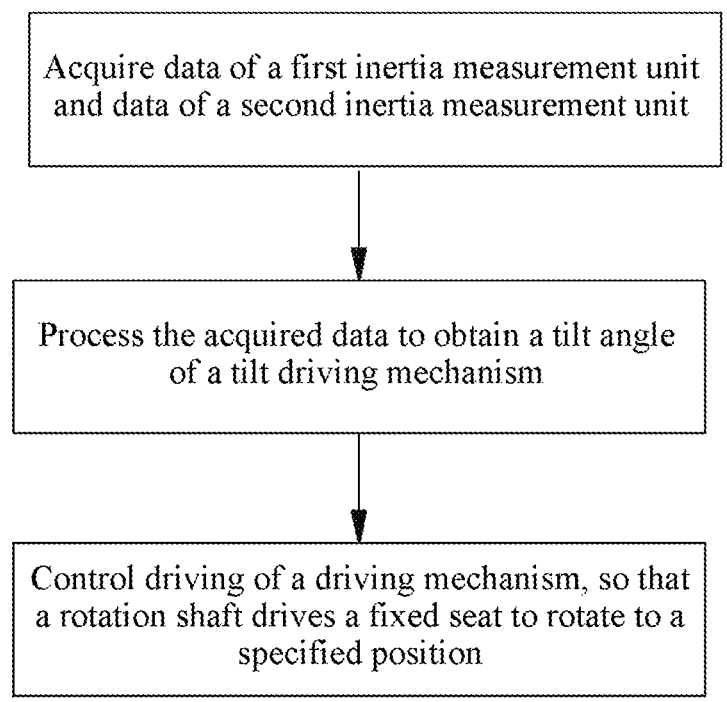
FIG. 11 is a flowchart of a control method for a tilt driving mechanism according to the present disclosure.

FIG. 11 is a flowchart of a control method for a tilt driving mechanism 100. The control method includes steps of:

acquiring data of a first inertia measurement unit 4 and data of a second inertia measurement unit 5;

processing the acquired data to obtain a tilt angle of a tilt driving mechanism 100; and controlling driving of a driving mechanism, so that a rotation shaft 231 drives a mounting seat 3 to rotate to a set position.

As an optional implementation, before the step of controlling driving of a driving mechanism, so that a rotation shaft 231 drives a mounting seat 3 to rotate to a set position, the method further includes steps of:

controlling a driving motor 212 of the driving mechanism to rotate one revolution; and calculating a rotation angle the tilt driving mechanism rotates when the driving motor 212 rotates on revolution according to a reduction ratio n1 of a retarding mechanism 213 connected to the driving motor 212 and a transmission ratio n2 between a first rotation mechanism 22 and a second rotation mechanism 23 in the driving mechanism, where the rotation angle of the tilt driving mechanism equals 360°/(n1*n2). As such, a relationship between the rotation angle of the mounting seat 3 and the rotation angle of the driving motor 212 is obtained through calculation.

Moreover, after the step of processing the acquired data to obtain a tilt angle of a tilt driving mechanism 100, the method further includes steps of:

calculating, according to the acquired tilt angle, an angle difference by which the tilt driving mechanism 100 needs to rotate when the mounting seat 3 rotates to the set position;

calculating a rotation angle of the driving motor 212 according to the angle difference and the rotation angle; and controlling the driving motor 212 to rotate, so that the tilt driving mechanism drives the rotation shaft 231 to rotate, thereby driving the mounting seat 3 to rotate to the set position.

Preferably, the tilt driving mechanism in the control method is the tilt driving mechanism provided in Embodiment 1 of the present disclosure.

According the foregoing control method for the tilt driving mechanism 100, a rotation angle of the tilt driving mechanism 100 can be controlled with high precision by measuring a tilt angle position of the tilt driving mechanism 100 in real time, so as to change a direction of the power unit 300 mounted on the tilt driving mechanism 100. As such, the power unit 300 can switch between a lift force providing position and a thrust providing position, facilitating miniaturization design of the tilt driving mechanism 100, and improving stability and safety of the tilt driving mechanism 100. Therefore, utilization of the power unit 300 is improved and the objective of efficient flight is achieved.

Apparently, the foregoing embodiments are merely examples listed for making the description clear, but are not intended to limit the implementation. A person of ordinary skill in the art can make other different forms of changes or modifications based on the description. Here, it is unnecessary and impossible to exhaust all implementations. Obvious changes or modifications that are derived from the present disclosure still fall in the protection scope of the present disclosure.

What is claimed is:

1. A tilt driving mechanism, mounted on an aircraft to control tilting of a power unit of the aircraft, wherein the tilt driving mechanism comprises:

a housing, fixedly mounted on the aircraft;

a driving mechanism, mounted in the housing; and a mounting seat, flexibly mounted on the housing, the power unit being fixedly mounted on the mounting seat, and the driving mechanism being fixedly connected to the mounting seat, so as to drive the mounting seat to rotate with respect to the housing, wherein the driving mechanism comprises a power source, a first rotation mechanism, and a second rotation mechanism, wherein an output shaft of the power source is connected to the first rotation mechanism, a rotation shaft on the second rotation mechanism is fixedly connected to the mounting seat, and when the output shaft of the power source drives the first rotation mechanism to rotate, the second rotation mechanism and the first rotation mechanism are in a transmission fit, and wherein the housing comprises a first shell and a second shell that are detachable and cooperate with each other, a receiving cavity is formed between the first shell and the second shell, and the driving mechanism is received in the receiving cavity.

2. The tilt driving mechanism according to claim 1, wherein two slots are provided on side walls of the receiving cavity and a baffle plate is inserted in the slots, wherein the baffle plate partitions the receiving cavity into a first cavity and a second cavity, wherein the power source is disposed in the first cavity, and the first rotation mechanism and the second rotation mechanism are disposed in the second cavity.

3. The tilt driving mechanism according to claim 2, wherein the baffle plate is provided with a through hole, the power source is fixedly mounted on the baffle plate, and the output shaft of the power source passes through the through hole and extends into the second cavity.

4. The tilt driving mechanism according to claim 2, wherein the first rotation mechanism is a worm, and the second rotation mechanism is a worm gear; wherein worm bearings are disposed at both ends of a worm shaft of the worm respectively, a worm gear shaft of the worm gear is the rotation shaft, and worm gear bearings are disposed at both ends of the worm gear shaft respectively; and wherein two first bearing cavities and two second bearing cavities are provided on an inner wall of the second cavity, the worm bearings are disposed in the first bearing cavities, and the worm gear bearings are disposed in the second bearing cavities.

5. The tilt driving mechanism according to claim 4, wherein the driving mechanism further comprises a connection mechanism, the connection mechanism is disposed between the output shaft and the worm shaft, so as to connect the output shaft and the worm shaft.

6. The tilt driving mechanism according to claim 5, wherein the connection mechanism is a coupling component or a metal connection block.

7. The tilt driving mechanism according to claim 6, wherein the mounting seat is provided with a receiving space, wherein the fixed seat is inserted into the receiving space, and the power unit is mounted on an opposite external surface of the mounting seat which are in an insertion direction of the fixed seat.

8. The tilt driving mechanism according to claim 4, wherein the housing is fixedly provided with a fixed seat having an opening, wherein the mounting seat covers the fixed seat, and the opening is in communication with the second cavity, and wherein the worm gear protrudes out of the second cavity and extends into the fixed seat, and the worm gear shaft protrudes out of the housing and is fixedly connected to the mounting seat.

9. The tilt driving mechanism according to claim 4, wherein a lead angle of the worm is less than an equivalent friction angle between the worm gear and the worm mesh gear.

10. The tilt driving mechanism according to claim 1, wherein a controller is mounted in the aircraft; the power source comprises a driving motor, wherein two ends of a motor shaft of the driving motor are connected to a retarding mechanism and an encoder respectively, and wherein a rotation shaft of the retarding mechanism is the output shaft, and the encoder is electrically connected to the controller.

11. A plurality of tilt driving mechanisms according to claim 1, wherein the plurality of tilt driving mechanisms are mounted to an aircraft comprising a vehicle body and two wings disposed at two sides of the vehicle body, wherein stub wings perpendicular to a length direction of the wings are disposed on the two wings respectively, wherein one of the plurality of tilt driving mechanisms is disposed at both ends of the stub wing respectively.

12. The aircraft according to claim 11, wherein the power unit is a propeller.

13. The aircraft according to claim 11, wherein a controller is disposed in the vehicle body, a first inertia measurement unit is disposed on the mounting seat of the tilt driving mechanism, a second inertia measurement unit is disposed on the housing, wherein the controller is electrically connected to the first inertia measurement unit and the second inertia measurement unit, and wherein the controller obtains a position of the mounting seat of the tilt driving mechanism according to information collected by the first inertia measurement unit and the second inertia measurement unit.

14. The aircraft according to claim 11, wherein when the aircraft is in a taking off/landing or hovering state, the mounting seat of the tilt driving mechanism is in a vertical position; and when the aircraft is in a flight state, the mounting seat of the tilt driving mechanism is in a horizontal position, and power unit which are away from a flight direction on the stub wings stops working.

15. A control method for a tilt driving mechanism mounted on an aircraft, comprising:
  a housing, fixedly mounted on the aircraft;
  a tilt driving mechanism mounted in the housing;
  a mounting seat, flexibly mounted on the housing, the power unit being fixedly mounted on the mounting seat, and the tilt driving mechanism being fixedly connected to the mounting seat, so as to drive the mounting seat to rotate with respect to the housing, wherein the tilt driving mechanism comprises a power source, a first rotation mechanism, and a second rotation mechanism, wherein an output shaft of the power source is connected to the first rotation mechanism, a rotation shaft on the second rotation mechanism is fixedly connected to the mounting seat, and when the output shaft of the power source drives the first rotation mechanism to rotate, the second rotation mechanism and the first rotation mechanism are in a transmission fit; and
  wherein the housing comprises a first shell and a second shell that are detachable and cooperate with each other, a receiving cavity is formed between the first shell and the second shell, and the tilt driving mechanism is received in the receiving cavity; wherein the control method comprises the steps:
    acquiring data of the first inertia measurement unit and data of the second inertia measurement unit;
    processing the acquired data to obtain a tilt angle of the tilt driving mechanism; and controlling driving of the tilt driving mechanism, so that the rotation shaft drives the mounting seat to rotate to a set position.

16. The control method for a tilt driving mechanism according to claim 15, wherein before the step of controlling driving of the tilt driving mechanism, so that the rotation shaft drives the mounting seat to rotate to a set position, the method further comprises steps of:
controlling a driving motor of the tilt driving mechanism to rotate one revolution; and
calculating a rotation angle the tilt driving mechanism rotates when the driving motor rotates one revolution according to a reduction ratio n1 of a retarding mechanism connected to the driving motor and a transmission ratio n2 between a first rotation mechanism and a second rotation mechanism in the driving mechanism, wherein the rotation angle of the tilt driving mechanism equals $360°/(n1*n2)$.

17. The control method for a tilt driving mechanism according to claim 16, wherein after the step of processing the acquired data to obtain a tilt angle of the tilt driving mechanism, the method further comprises steps of:
calculating, according to the acquired tilt angle, an angle difference by which the tilt driving mechanism needs to rotate when the mounting seat rotates to the set position;
calculating a rotation angle of the driving motor according to the angle difference and the rotation angle; and
controlling the driving motor to rotate.

18. The control method for a tilt driving mechanism to claim 15, wherein two slots are provided on side walls of the receiving cavity and a baffle plate is inserted in the slots, wherein the baffle plate partitions the receiving cavity into a first cavity and a second cavity, wherein the power source is disposed in the first cavity, and the first rotation mechanism and the second rotation mechanism are disposed in the second cavity.

19. The control method for a tilt driving mechanism according to claim 18, wherein the baffle plate is provided with a through hole, the power source is fixedly mounted on the baffle plate, and the output shaft of the power source passes through the through hole and extends into the second cavity.

20. The control method for a tilt driving mechanism according to claim 18, wherein a controller is mounted in the aircraft; the power source comprises a driving motor, wherein two ends of a motor shaft of the driving motor are connected to a retarding mechanism and an encoder respectively, and wherein a rotation shaft of the retarding mechanism is the output shaft, and the encoder is electrically connected to the controller.

21. The control method for a tilt driving mechanism according to claim 18, wherein the first rotation mechanism is a worm, and the second rotation mechanism is a worm gear; wherein worm bearings are disposed at both ends of a worm shaft of the worm respectively, a worm gear shaft of the worm gear is the rotation shaft, and worm gear bearings are disposed at both ends of the worm gear shaft respectively; and wherein two first bearing cavities and two second bearing cavities are provided on an inner wall of the second cavity, the worm bearings are disposed in the first bearing cavities, and the worm gear bearings are disposed in the second bearing cavities.

22. The control method for a tilt driving mechanism according to claim 21, wherein the driving mechanism further comprises a connection mechanism, the connection mechanism is disposed between the output shaft and the worm shaft, so as to connect the output shaft and the worm shaft.

23. The control method for a tilt driving mechanism according to claim 22, wherein the connection mechanism is a coupling component or a metal connection block.

24. The control method for a tilt driving mechanism according to claim 23, wherein the mounting seat is provided with a receiving space, wherein the fixed seat is inserted into the receiving space, and the power unit is mounted on an opposite external surface of the mounting seat which are in an insertion direction of the fixed seat.

25. The control method for a tilt driving mechanism according to claim 21, wherein the housing is fixedly provided with a fixed seat having an opening, wherein the mounting seat covers the fixed seat, and the opening is in communication with the second cavity, and wherein the worm gear protrudes out of the second cavity and extends into the fixed seat, and the worm gear shaft protrudes out of the housing and is fixedly connected to the mounting seat.

26. The control method for a tilt driving mechanism according to claim 21, wherein a lead angle of the worm is less than an equivalent friction angle between the worm gear and the worm mesh gear.

27. A tilt driving mechanism, mounted on an aircraft to control tilting of a power unit of the aircraft, wherein the tilt driving mechanism comprises:
a housing, fixedly mounted on the aircraft;
a driving mechanism, mounted in the housing; and
a mounting seat, flexibly mounted on the housing, the power unit being fixedly mounted on the mounting seat, and the driving mechanism being fixedly connected to the mounting seat, so as to drive the mounting seat to rotate with respect to the housing, wherein the driving mechanism comprises a power source, a first rotation mechanism, and a second rotation mechanism, wherein an output shaft of the power source is connected to the first rotation mechanism, a rotation shaft on the second rotation mechanism is fixedly connected to the mounting seat, and when the output shaft of the power source drives the first rotation mechanism to rotate, the second rotation mechanism and the first rotation mechanism are in a transmission fit, and
wherein a controller is mounted in the aircraft; the power source comprises a driving motor, wherein two ends of a motor shaft of the driving motor are connected to a retarding mechanism and an encoder respectively, and wherein a rotation shaft of the retarding mechanism is the output shaft, and the encoder is electrically connected to the controller.

* * * * *